(12) United States Patent
Kaneko et al.

(10) Patent No.: US 9,890,517 B2
(45) Date of Patent: Feb. 13, 2018

(54) HYBRID WHEEL LOADER

(71) Applicant: KCM Corporation, Hyogo (JP)

(72) Inventors: Satoru Kaneko, Tokyo (JP); Takashi Ikimi, Tsuchiura (JP); Noritaka Itou, Tsuchiura (JP); Satoshi Sekino, Tsuchiura (JP)

(73) Assignee: KCM CORPORATION, Hyogo (JP)

( * ) Notice: Subject to any disclaimer, the term of this patent is extended or adjusted under 35 U.S.C. 154(b) by 165 days.

(21) Appl. No.: 15/021,806

(22) PCT Filed: Oct. 8, 2014

(86) PCT No.: PCT/JP2014/077015
§ 371 (c)(1),
(2) Date: Mar. 14, 2016

(87) PCT Pub. No.: WO2015/104878
PCT Pub. Date: Jul. 16, 2015

(65) Prior Publication Data
US 2016/0230369 A1    Aug. 11, 2016

(30) Foreign Application Priority Data
Jan. 7, 2014 (JP) .................................. 2014-001198

(51) Int. Cl.
*E02F 9/20* (2006.01)
*B60W 10/26* (2006.01)
(Continued)

(52) U.S. Cl.
CPC .............. *E02F 9/2075* (2013.01); *B60K 6/46* (2013.01); *B60W 10/06* (2013.01); *B60W 10/08* (2013.01);
(Continued)

(58) Field of Classification Search
CPC ......... B60K 6/46; B60W 10/08; B60W 10/26; B60W 30/188; B60W 2710/0644; B60W 2510/30; E02F 9/2075
See application file for complete search history.

(56) References Cited

U.S. PATENT DOCUMENTS 8,862,360 B1 * 10/2014 Goraya .............. B60K 31/0058
701/71
2011/0313608 A1 * 12/2011 Izumi ........................ B60L 1/20
701/22
(Continued)

FOREIGN PATENT DOCUMENTS

| JP | 2008-008183 A | 1/2008 |
| JP | 2013-203234 A | 10/2013 |
| WO | 2012/114782 A1 | 8/2012 |

OTHER PUBLICATIONS

International Search Report of PCT/JP2014/077015 dated Nov. 11, 2014.
(Continued)

*Primary Examiner* — Mussa A Shaawat
(74) *Attorney, Agent, or Firm* — MATTINGLY & MALUR, PC

(57) ABSTRACT

A hybrid wheel loader includes a control device (200) that estimates output power of an engine (1) and an electricity storage device (11) when the hybrid wheel loader is inferred on the basis of output values of detectors (62, 63) to be traveling towards an object of excavation in order to perform an excavating work, and then, if the output power is less than target power considered necessary for the excavating work, accelerates the engine (1) to a target revolution speed while increasing the electric power supplied from the electricity storage device to a traveling motor (9). Accordingly, power necessary for excavation can be drawn from the engine even when the engine revolution speed is low and there is a fear (Continued)

of power deficiency occurring at the time of the excavating work.

5 Claims, 8 Drawing Sheets

(51) Int. Cl.
    *B60W 10/08*     (2006.01)
    *B60W 30/188*     (2012.01)
    *B60K 6/46*     (2007.10)
    *B60W 10/06*     (2006.01)
    *B60W 20/00*     (2016.01)
    *E02F 9/22*     (2006.01)
    *B60W 20/13*     (2016.01)

(52) U.S. Cl.
    CPC ............ *B60W 10/26* (2013.01); *B60W 20/00* (2013.01); *B60W 20/13* (2016.01); *B60W 30/188* (2013.01); *E02F 9/2246* (2013.01); *B60W 2400/00* (2013.01); *B60W 2510/30* (2013.01); *B60W 2530/00* (2013.01); *B60W 2710/0644* (2013.01); *B60W 2710/0677* (2013.01); *B60W 2710/248* (2013.01); *Y10S 903/93* (2013.01)

(56) References Cited

U.S. PATENT DOCUMENTS

| | | | | |
|---|---|---|---|---|
| 2013/0288856 A1* | 10/2013 | Li | ........................ | B60W 50/085 477/110 |
| 2014/0005898 A1* | 1/2014 | Byers | ..................... | B60K 28/16 701/50 |
| 2014/0020375 A1* | 1/2014 | Fujishima | ............. | B60W 20/00 60/431 |
| 2014/0147238 A1* | 5/2014 | Izumi | .................... | E02F 9/2091 414/687 |
| 2014/0148984 A1* | 5/2014 | Nishi | ..................... | B60K 6/485 701/22 |
| 2014/0188320 A1* | 7/2014 | Moriki | .................. | E02F 9/2075 701/22 |
| 2016/0215480 A1* | 7/2016 | Ishihara | ................ | E02F 9/2075 |

OTHER PUBLICATIONS

International Preliminary Report on Patentability received in corresponding International Application No. PCT/JP2014/077015 dated Jul. 21, 2016.

* cited by examiner

HYBRID WHEEL LOADER

TECHNICAL FIELD

The present invention relates to a hybrid wheel loader that travels by combined use of electric power supplied by a generator and by an electricity storage device.

BACKGROUND ART

In recent years, there has been an increasing inclination towards energy saving concerning industrial products, from the viewpoints of coping with environmental problems and the rising crude-oil prices. This trend is also seen in the field of working vehicles (for example, construction vehicles and industrial vehicles) hitherto dependent mainly on hydraulic drive systems powered by diesel engines. In this field, there have been an increasing number of cases of contriving higher efficiency and energy saving by electric-motorization.

For example, in the case where a drive part of a working vehicle is electric-motorized (namely, where an electric motor is used as a drive source), many energy-saving effects can be expected, such as high-efficiency driving of an engine (in the case of a hybrid model with an engine mounted thereon), enhancement of power transmission efficiency, and recovery of regenerative electric power as well as a reduction in the amount of exhaust gas. In the field of working vehicles, fork lifts have been electric-motorized markedly, and the so-called "battery fork lifts" in which a motor is driven by electric power from a battery have been put to practical use. Besides, recently, in engine-type hydraulic excavators and fork lifts and the like, "hybrid vehicles" in which a combination of diesel engine with electric motor is used as a drive source have started to appear as products. Further, the working vehicles that are expected to exhibit a fuel consumption-reducing effect when hybridized include the wheel loader. A conventional wheel loader is a working vehicle that excavates and transport earth and sand or the like by a bucket part of a hydraulic working device mounted to a front side of the vehicle while traveling by transmitting power of an engine to wheels through a torque converter and a transmission (T/M), for example.

Meanwhile, as a typical working mode of the wheel loader, there is a V-shape excavating work. In the V-shape excavating work, the wheel loader first travels forward towards an object of excavation such as gravel heap, plunges into the object of excavation, and then crowds (tilts) the bucket to load the matter to be transported, such as the gravel, into the bucket. Thereafter, the wheel loader travels backward to return to an original position, and travels forward towards a transport vehicle such as a dump track while raising the bucket. Then, the wheel loader dumps the bucket to load (dump) the matter to be transported onto the transport vehicle, and thereafter travels again backward to return into the original position. The vehicle repeats this work while moving along the V-shaped locus as described above.

In such a V-shape excavating work, the wheel loader performs the work by distributing the power of the engine to a traveling part and a hydraulic part of a hydraulic working device. The V-shape excavating work is basically a work conducted on a substantially flat ground surface. In this case, the wheel loader plunges into the object of excavation with its hydraulic working device, and scoops up a large amount of the excavated matter with the hydraulic working device while generating a great traction force; therefore, a high power is needed for this motion.

On the other hand, traveling motions during such an excavating work may be conducted at a comparatively high vehicle velocity, from the viewpoint of contriving enhancement of operating efficiency (working efficiency) per time. In such a case, the vehicle velocity is largely lowered at the moment the wheel loader plunges into the object of excavation, and there is a possibility that variations in the engine revolution speed may fail to follow up to variations in vehicle velocity, and the engine revolution speed may not yet be sufficiently raised at the time when power is needed for the excavating work. In a state where the engine revolution speed has not yet been sufficiently raised, power necessary for excavation cannot be drawn from the engine. Therefore, there arises a possibility that the object of excavation cannot be excavated sufficiently by the bucket or that the earth and sand cannot be smoothly scooped up by the bucket. If such a situation is generated, the excavating work is redone after the engine revolution speed is raised to a required revolution speed. As a result, the operating efficiency is lowered.

A method of solving such kind of power deficiency is described, for example, in JP-2008-008183-A. In this technology, an auto-operated wheel loader is operated in such a manner that when a state of approaching an object of excavation is detected beforehand, the engine revolution speed is raised, so as to start an excavating work with the engine revolution speed at a high value, thereby contriving to avoid deficiency in power from the engine and to achieve smooth transition to the excavating work.

PRIOR ART DOCUMENT

Patent Document

Patent Document 1: JP-2008-008183-A

SUMMARY OF THE INVENTION

Problem to be Solved by the Invention

In the technology of the above-mentioned JP-2008-008183-A, all the power for driving a traveling motor, power for driving a hydraulic pump relevant to a hydraulic working device, power for accelerating an engine, and the like are supplied from the engine. Therefore, even if the engine power is increased in order to increase the engine revolution speed in response to detection of an excavating motion, the engine power is drawn to the traveling motor and the hydraulic pump, and, accordingly, the rising speed of the engine revolution speed is restrictive as compared to the case where the engine power is allotted only to acceleration of the engine. For this reason, depending on the engine revolution speed at the time of detection of the excavating motion or on the distance to the object of excavation, there is a possibility that the engine revolution speed cannot be raised to a target value by the time of contact with the object of excavation. It may be contemplated to cope with this problem by accelerating the engine with maximum power in such a manner that the rise in the engine revolution speed will be in time for the excavating work. In this case, however, an extra fuel injection is generated, and, as a result, fuel consumption may be worsened.

Accordingly, it is an object of the present invention to provide a hybrid wheel loader introduced for the purpose of reducing fuel consumption, such that required power can be drawn from an engine at the time of excavation, without worsening fuel consumption, even in the case where engine revolution speed is lowered and there is a possibility that power deficiency may occur during the subsequent excavating work.

Means For Solving the Problem

In order to achieve the above object, according to the present invention, there is provided a hybrid wheel loader that travels by driving a traveling motor through utilizing at least one of electric power generated by driving a motor generator by an engine and electric power stored in an electricity storage device and that has a hydraulic working device on a front side of the vehicle. The hybrid wheel loader includes: a motion detector that detects a motion of the wheel loader; and a control device that estimates output power being outputted by the engine and the electricity storage device when the wheel loader is inferred on the basis of an output value of the motion detector to be traveling towards an object of excavation in order to start an excavating work, and then, if the output power is less than target power considered necessary for the excavating work, accelerates the engine to an engine revolution speed necessary for outputting the target power-by the engine and the electricity storage device while increasing the electric power supplied from the electricity storage device to the traveling motor as compared with the electric power supplied when the wheel loader is inferred on the basis of other output value of the motion detector not to be traveling towards an object of excavation in order to start an excavating work.

Effect of the Invention

According to the present invention, required power can be drawn out from an engine at the time of excavation, without worsening fuel consumption, even in the case where engine revolution speed is lowered and there is a possibility that power deficiency may occur during the subsequent excavating work.

MODES FOR CARRYING OUT THE INVENTION

Figure 1:
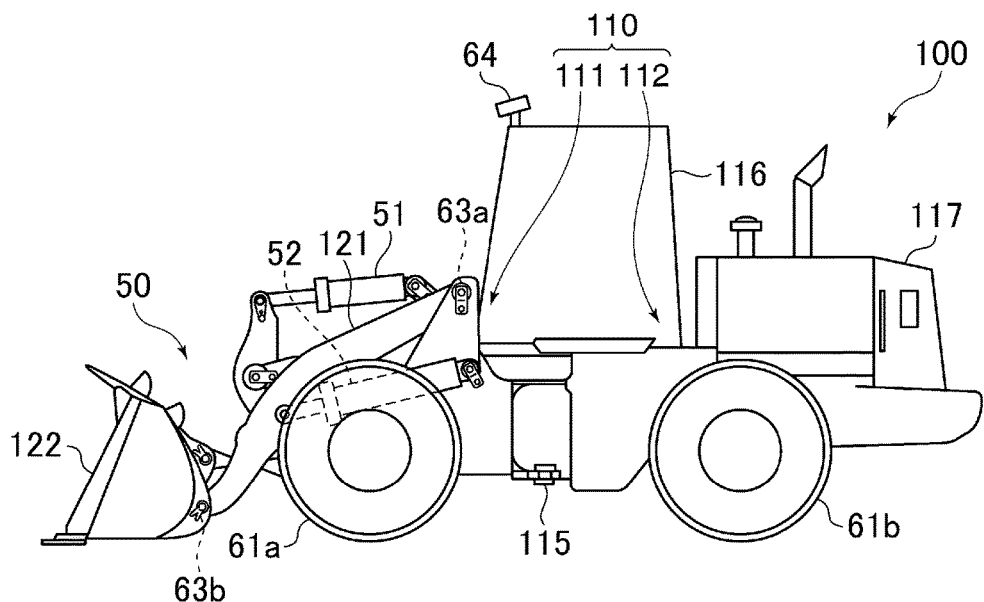
FIG. 1 is a side view of a hybrid wheel loader according to an embodiment of the present invention.

As will be described in detail later, in each embodiment of the present invention, a hybrid wheel loader that travels by driving a traveling motor through utilizing at least one of electric power generated by driving a motor generator by an engine and electric motor stored in an electricity storage device (secondary battery or capacitor) and that has a hydraulic working device including a bucket and a lift arm on a front side of the vehicle includes: a motion detector that detects motion of the wheel loader; and a control device that estimates output power being outputted by the engine and the electricity storage device when the wheel loader is inferred on the basis of an output value of the motion detector to be traveling towards an object of excavation ("(1) forward movement" described later) in order to start an excavating work, and then, if the output power is less than target power considered necessary for the excavating work, accelerates the engine to an engine revolution speed necessary for outputting the target power by the engine and the electricity storage device while increasing the electric power supplied from the electricity storage device to the traveling motor as compared with the electric power supplied when the wheel loader is inferred on the basis of other output value of the motion detector not to be traveling towards an object of excavation in order to start an excavating work.

In the hybrid wheel loader thus configured, the control device determines on the basis of the output value of the motion detector whether or not the wheel loader is traveling towards an object of excavation in order to start an excavating work, as part of a series of excavating motions during an excavating work. Then, when it is inferred that the wheel loader is conducting the traveling motion, the control device compares the power (output power) being outputted by the engine and the electricity storage device with power (target power) preset or preliminarily calculated as a value of power to be outputted by the engine and the electricity storage device for the purpose of realizing a smooth excavating work. If the result of the comparison shows that the output power is less than the target power, the control device accelerates the engine to an engine revolution speed necessary for outputting the target power by the engine and the electricity storage device while increasing the electric power supplied from the electricity storage device to the traveling motor as compared with the electric power supplied when it is inferred that the traveling motion is not conducted. When the driving of the traveling motor and the acceleration of the engine are conducted in this manner, the engine output that can be utilized for the acceleration of the engine can be increased according to the utilization of the electric power of the electricity storage device for the driving of the traveling motor. Therefore, the engine revolution speed can be raised to a target value in a shorter time as compared to the case where the electric power of the electricity storage device is not utilized for the driving of the traveling motor. In addition, since a state where the engine revolution speed has been raised can be easily obtained before the bucket contacts the object of excavation, the possibility of power deficiency being generated during an excavating work is lowered.

Therefore, according to the present invention, even in the case where it is intended to start the excavating motion with the engine revolution speed at a comparatively low speed (for example, in the case where the V-shape excavating work is conducted in a short-time cycle by moving the wheel loader at a comparatively high velocity), it is possible to draw required power from the engine, starting from the moment the bucket contacts the object of excavation, without worsening fuel consumption of the engine. In addition, since it is made easy to perform the V-shape excavating work in short-time cycle, operating efficiency (working efficiency) per time can be enhanced.

In addition, it is preferred that a configuration is adopted such that the wheel loader further includes position detectors for detecting positions of a bucket and a lift arm included in the hydraulic working device and a velocity detector for detecting the velocity of the wheel loader as the motion detector, and that the control device determines on the basis of the positions of the bucket and the lift arm and the velocity whether or not the wheel loader is traveling towards an object of excavation in order to start the excavating motion.

As the position detectors, for example, rotational angle sensors for the bucket and the lift arm can be utilized. Then, when a combination of two angles relevant to a state where the lift arm has been lowered and a state where an aperture portion of the bucket is facing forward can be detected by the two rotational angle sensors, it can be inferred that the hydraulic working device is maintained in a posture relevant to a forward movement towards an object of excavation as a preparatory motion in the excavating work. When it can be determined that the vehicle velocity detected by the velocity detector is in excess of a preset value indicative of the wheel loader being in forward traveling, in addition to the just-mentioned inference, it is inferred that the wheel loader is traveling forward towards the object of excavation as a preparatory motion in the excavating work, and a series of processings relevant to the driving of the traveling motor and the acceleration of the engine can be carried out only during the preparatory motion.

Besides, a configuration may be adopted such that the wheel loader further includes a distance detector for detecting the distance from the wheel loader to an object of excavation and a velocity detector for detecting the velocity of the wheel loader as the motion detector, and the control device determines on the basis of the distance to the object of excavation and the vehicle velocity whether or not the wheel loader is traveling towards the object of excavation for the purpose of an excavating work. In this case, also, the wheel loader can be inferred on the basis of the approach of the wheel loader to the object of excavation and the velocity of the wheel loader to be traveling forward towards the object of excavation as a preparatory motion in an excavating work, and, therefore, a series of processings relevant to the driving of the traveling motor and the acceleration of the engine can be carried out only during the preparatory motion.

In place of the motion detector, the wheel loader may include a switch that can be selectively switched into a first switch position and a second switch position and may include a control device that estimates output power being outputted by the engine and the electricity storage device when the switch is in the first switch position, and then, if the output power is less than target power considered necessary for an excavating work, accelerates the engine to an engine revolution speed necessary for outputting the target power by the engine and the electricity storage device while increasing the electric power supplied from the electricity storage device to the traveling motor as compared with the electric power supplied when the switch is in the second switch position. Note that as the switch, for example, a switch or lever that can be selectively switched into the first switch position and the second switch position by an operator's manual operation can be utilized.

Where such a configuration as just-mentioned is adopted, a state where the series of processings relevant to the driving of the traveling motor and the acceleration of the engine can be carried out is maintained during when the switch is in the first switch position, and, therefore, effective use of the wheel loader along the operator's intension or a working plan or the like can be easily performed. For example, in a situation where it is assumed that an excavating work is carried out continuedly, the work can be performed by changing over the switch into the first switch position. Besides, where it is previously known that a situation where movement of the wheel loader is mainly aimed at and where an excavating work is not conducted will be continued, the intended work can be conducted by changing over the switch into the second switch position.

In addition, when there is surplus electric power in the electricity storage device even if electric power is supplied from the electricity storage device to the traveling motor, it is preferable to put the motor generator into a power running operation and accelerate the engine by the surplus electric power. This results in that the drive of the engine is assisted by the motor generator, so that the time required for accelerating the engine to the target revolution speed can be further shortened. Besides, the fuel consumption of the engine in that instance can also be reduced.

An embodiment of the present invention will be described below using the drawings. FIG. 1 is a side view of a hybrid wheel loader according to an embodiment of the present invention. Note that in each of the drawings the same parts are denoted by the same reference symbols, and description of the same parts may sometimes be omitted.

A wheel loader 100 depicted in FIG. 1 includes a vehicle, body 110, and a hydraulic working device 50 mounted to a front side of the vehicle body 110. For the vehicle body 110, an articulated steering type (vehicle body bending type) is adopted. A front vehicle body (front frame) 111 and a rear vehicle body (rear frame) 112 with wheels 61 (front wheels 61$a$ and rear wheels 61$b$) mounted respectively to the left and right thereof are connected by a pin 115 having an axis substantially in the vertical direction. Though not depicted in FIG. 1, steering cylinders 53 (see FIG. 2) are disposed on both the left and right sides of the pin 115 in such a manner as to connect the front vehicle body 111 and the rear vehicle body 112. When a steering wheel (not shown) disposed inside an operating room (cab) 116 is operated, the rear vehicle body 112 and the front vehicle body 111 are folded (swung) around the pin 115, attendantly on extension/contraction driving of the steering cylinders 53.

On the rear vehicle body 112, there are mounted the operating room 116 on the front side and an engine room 117 on the rear side. In the engine room 117, there are accommodated a diesel engine 1, a hydraulic pump 4, a control valve 55, a motor generator 6, an electricity storage device 11 and a traveling motor 9, etc., which are depicted in FIG. 2.

The hydraulic working device 50 includes lift arms 121 and a bucket 122, and lift cylinders 52 and a bucket cylinder 51 driven to extend and contract for driving the lift arms 121 and the bucket 122. Note that one of the lift arms 121 and one of the lift cylinders 52 are provided on each of the left and right sides of the front vehicle body 111, but another one of the lift arms 121 and another one of the lift cylinders 52 on the right side that are hidden in FIG. 1 will be omitted in the following description.

The lift arms 121 are turned vertically (moved vertically) attendant on extension/contraction driving of the lift cylinders 52. The bucket 122 is turned vertically (a dumping motion or a crowding motion) attendant on extension/contraction driving of the bucket cylinder 51. Note that the wheel loader 100 illustrated adopts a Z link type (bell crank type) link mechanism as a link mechanism for operating the bucket 122. The link mechanism includes the bucket cylinder 51.

Figure 2:
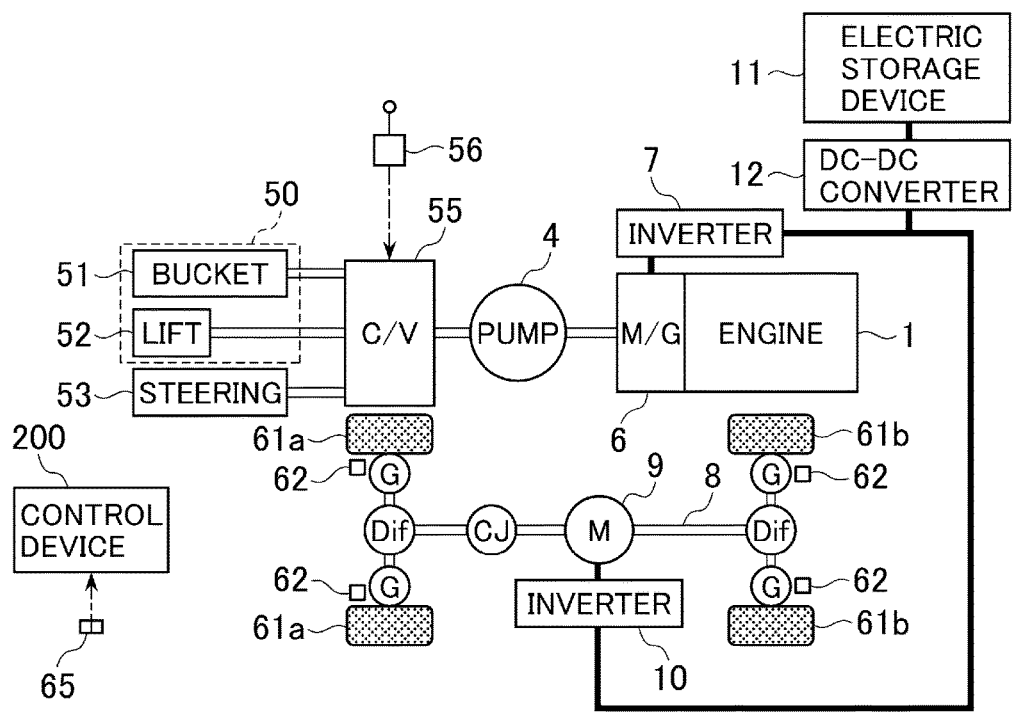
FIG. 2 is a system block diagram of the wheel loader 100 depicted in FIG. 1.

FIG. 2 is a system block diagram of the wheel loader 100 depicted in FIG. 1. The wheel loader depicted in this figure includes: the diesel engine 1; the motor generator (M/G) 6 mechanically connected to the engine 1 and driven by the engine 1; an inverter device 7 for controlling the motor generator 6; the hydraulic pump 4 mechanically connected to the motor generator 6 and driven at least one of the motor generator 6 and the engine 1; hydraulic actuators (the bucket cylinder 51, the lift cylinders 52, and steering cylinders 53) driven by hydraulic fluid supplied from the hydraulic pump 4 through the control valve 55; the traveling motor 9 attached to a propeller shaft 8 through a differential gear (Dif) and gears (G) and driving the four wheels 61; an inverter device 10 for controlling the traveling motor 9; the electricity storage device 11 electrically connected to the inverters 7 and 10 (the motor generator 6 and the traveling motor 9) through a DC-DC converter 12 and transferring DC power to and from the inverters 7 and 10; an operating system (an operating lever 56 and the steering wheel (not shown)) outputting operation signals for driving the hydraulic actuators 51, 52 and 53 according to operation amounts; and a control device 200 totally controlling the hybrid system by executing various control processings for exhibiting performances required of the wheel loader 100.

Further, the wheel loader 100 is provided with: rotary encoders 62, for detecting rotational amount, rotational angle and rotational position of each of the wheels 61, that are utilized for calculating the velocity of the wheel loader 100 (vehicle velocity); a work setting switch 65 for selectively instructing continued execution of control of the traveling motor 9 and the engine 1 suited to an excavating work (processings of S102 to S105 in FIG. 7 to be described later); a rotary potentiometer (angle detector) 63*a* for detecting the rotational angle of the lift arms 121 relative to the front vehicle body 111; and a rotary potentiometer (angle detector) 63*b* for detecting the rotational angle of the bucket 122 relative to the left arms 121.

To the control device 200, there are inputted: an operation signal (inclusive of an operation amount) outputted from an operating lever (front part lever) 56; step-in amounts of an accelerator pedal and a brake pedal disposed in the operating room 116; a switch signal (forward/backward movement signal) of an F/R switch (not shown) for selectively instructing forward/backward movement of the wheel loader; rotation speeds of the wheels 61 detected by the encoders 62; revolution speed of the traveling motor 9 outputted from the inverter 10; the revolution speed of the engine 1 (engine revolution speed); the current SOC of the electricity storage device 11 calculated by an electricity storage control device (DC-DC converter 12); a switch position of the work setting switch 65; and rotational angles of the lift arms 121 and the bucket 122 detected by the potentiometers 63*a* and 63*b*.

The wheel loader is a working vehicle that includes a traveling drive part (wheel part) relevant to the four wheels 61 and a hydraulic drive part (lift/bucket part) relevant to the hydraulic working device 50 at a front portion, and that excavates and transports earth and sand or the like by the hydraulic working device 50 driven by the hydraulic pump 4, while traveling by the four wheels 61 with an output of the engine 1 as a main power source. The traveling motor 9 is driven by utilizing at least one of electric power generated by driving the motor generator 6 by the engine 1 and electric power stored in the electricity storage device 11, whereby the four wheels 61 are driven and traveling of the wheel loader is realized.

As the electricity storage device 11, a secondary battery such as a lithium battery and an electric double layer capacitor having a comparatively high electric capacity can be mounted. A raising/lowering control of the voltage of the electricity storage device 11 is conducted by the DC-DC converter 12, and DC power is transferred between the electricity storage device 11 and the inverters 7 and 10.

Figure 3:
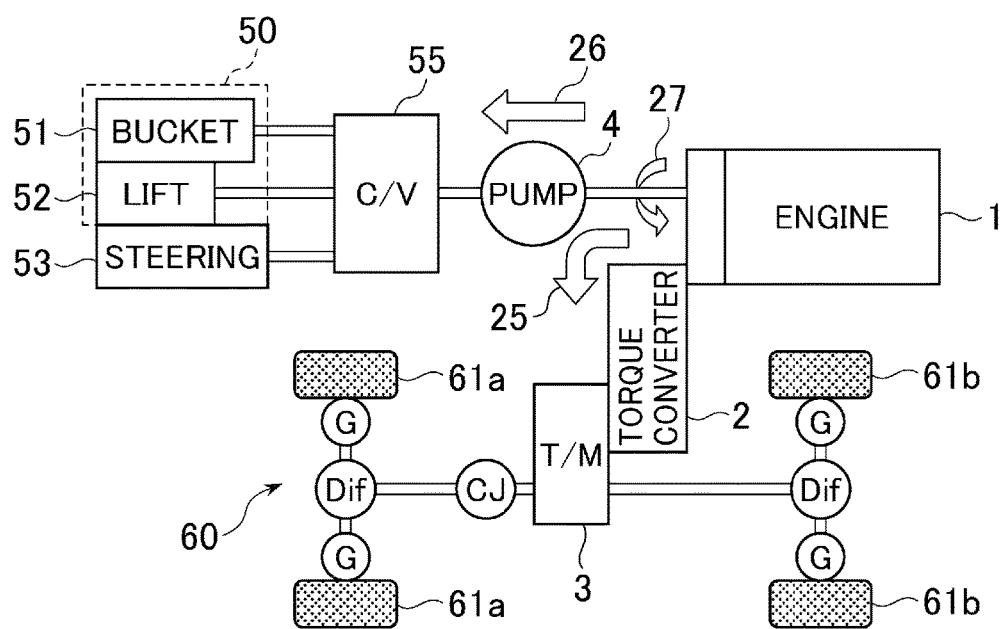
FIG. 3 is a view depicting a typical configuration example of a conventional wheel loader.

FIG. 3 is a view depicting a typical configuration example of a conventional wheel loader. The conventional wheel loader illustrated in this figure includes a track structure 60 and a hydraulic working device 50 (lift/bucket part) as main drive parts, travels by transmitting power of an engine 1 to wheels 61 through a torque converter 2 and a transmission (T/M) 3, and, further, excavates and transports earth and sand or the like by the hydraulic working device 50 driven by a hydraulic pump 4. The efficiency of power transmission through the torque converter is poorer than that by electricity. On the other hand, in the wheel loader illustrated in FIG. 2, the traveling drive part is electric-motorized (inclusive of parallel hybrid configuration), and a traveling motion is realized by driving the traveling motor 9 by utilizing the electric power generated by the motor generator 6 driven by the power of the engine 1 mainly. In this case, in the electricity storage device 11, absorption of regenerative electric power at the time of vehicle braking and output assisting with respect to the engine 1 are conducted, so as thereby to reduce energy consumption by the vehicle.

Figure 4:
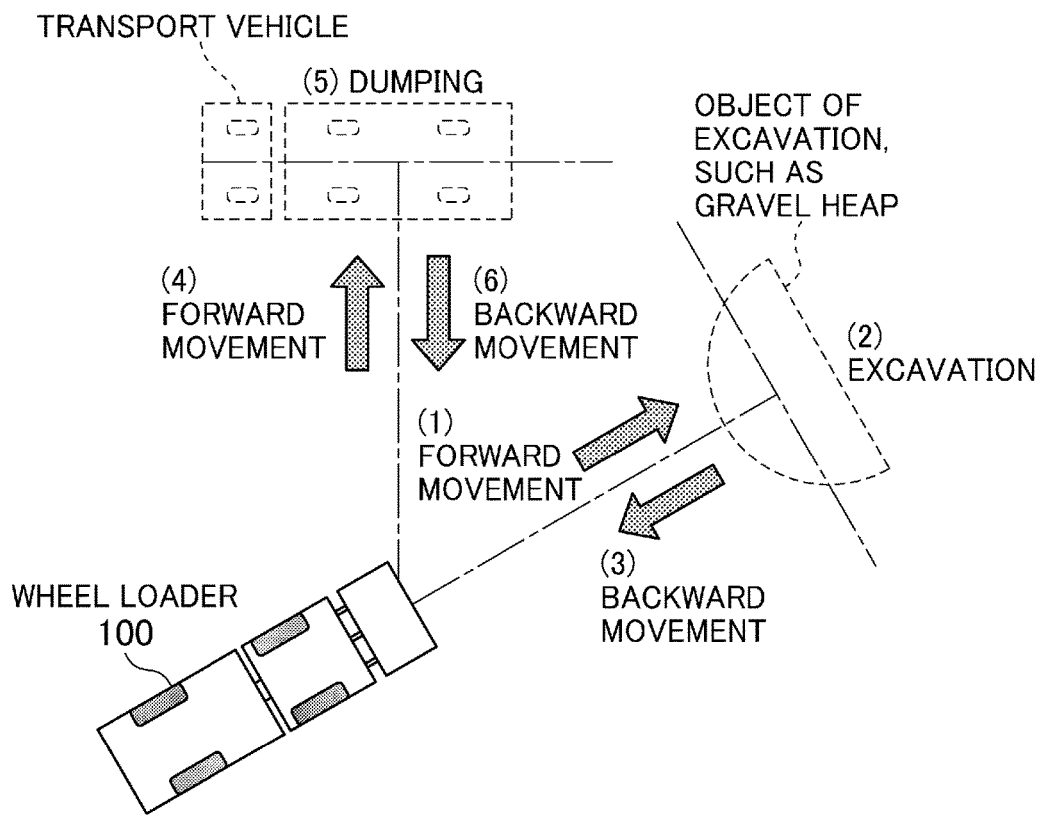
FIG. 4 is a view depicting a V-shape excavating motion as an example of a working pattern of a wheel loader.

Meanwhile, as has been mentioned above, typical working patterns of the wheel loader to which the present invention is applied include the V-shape excavating work. An outline of the V-shape excavating work is illustrated in FIG. 4. Here, a series of motions of the wheel loader to be conducted continuously in order to carry out the V-shape excavating work are classified into six motions, that is, (1) forward movement, (2) excavating motion, (3) backward movement, (4) forward movement, (5) dumping motion, and (6) backward movement. The work relevant to the former three motions (1) to (3) is referred to as "excavating work", while the work relevant to the latter three motions (4) to (6) is referred to as "transporting work", and, here, the three motions (1) to (3) relevant to the excavating work will be described.

Figure 5:
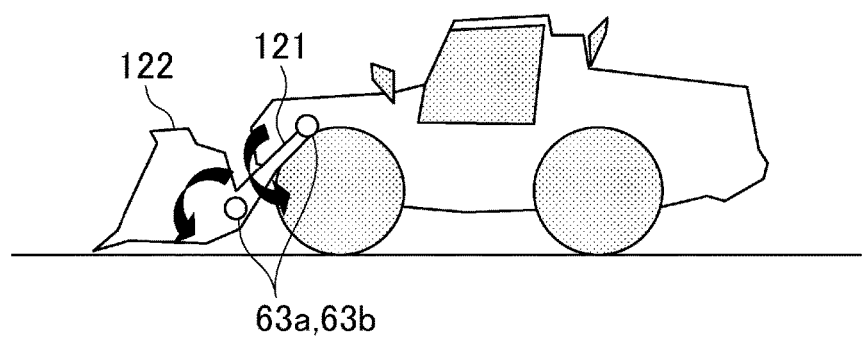
FIG. 5 is a view depicting positional states of a lift arm and a bucket (the posture of a hydraulic working device) during a forward movement in an excavating work.

The (1) forward movement relevant to the excavating work is important as a preparatory motion for the subsequent (2) excavating motion. In the (1) forward movement, the wheel loader travels forward towards an object of excavation (gravel heap or the like) while maintaining the posture of the hydraulic working device in such a manner that the lift arm has been lowered and that the aperture portion of the bucket is facing the object of excavation, and plunges into the object of excavation starting from the hydraulic working device. FIG. 5 illustrates the positional state of the lift arms 121 and the bucket 122 (the posture of the hydraulic working device) during the (1) forward movement. Note that a bottom surface of the bucket 122 is preferably kept parallel to the ground surface during the forward movement.

In the subsequent (2) excavating motion, the wheel loader moves forward from the state with the hydraulic working device in contact with the object of excavation to push the bucket into the object, to be excavated, and while doing so, performs two motions of lift arm raising and bucket crowding, so as to scoop up the matter to be transported, such as gravel, while loading the matter to be transported into the bucket. Note that both the lift arm raising motion and the bucket crowing motion relevant to the excavating motion may be individually conducted by independent operations or may be simultaneously conducted by a combined operation.

Then, in the (3) backward movement, the wheel loader returns to the position where it has been before the (1) forward movement, in a state where the bucket loaded with the matter to be transported and lifted up in the (2) excavating motion is set to face its aperture portion upward, by performing two motions of lift arm lowering and backward movement. Note that both the lift arm lowering motion and the backward movement may be individually conducted by independent operations or may be simultaneously conducted by a combined operation.

As above mentioned, in the (1) forward movement and the (2) excavating motion at the time of an excavating work, the wheel loader plunges into the object of excavation with a great traction force and, thereafter, scoops up a large amount of the matter to be transported; therefore, high power is needed. In the case where the V-shape excavating work is repeated while using a comparatively low vehicle velocity, the revolution speed of the engine used as the power source for the excavating work is maintained around a target revolution speed, and, accordingly, the excavating work can be carried out without occurrence of power deficiency.

However, in some cases, the V-shape excavating work may be carried out while using a comparatively high vehicle velocity for both the transporting work and the excavating work. If the vehicle plunges into the object of excavation at a comparatively high velocity at the time of the excavating work, a great reduction in velocity is generated. Besides, in the case where the excavating work is repeatedly carried out while using a high vehicle velocity, variations in the engine revolution speed may fail to follow up to the variations in vehicle velocity, and the engine revolution speed may not be raised. Where the engine revolution speed is low, sufficient power cannot be obtained at the time of plunging into the object of excavation or at the time of scooping up the matter to be transported by the bucket. Therefore, the depth of plunging into the object of excavation may be shallow, so that a sufficient amount of the object of excavation cannot be loaded into the bucket, or a lot of time is taken for scooping up the matter to be transported into the bucket. Consequently, the operating efficiency may be lowered conspicuously.

A technology in which it is attempted to solve this kind of power deficiency in a general wheel loader depicted in FIG. 3 is described in Patent Document 1. This technology relates to a wheel loader that travels by transmitting power of an engine to tires through a torque converter (T/C) and a transmission (T/M), and while doing so, excavates and transports earth and sand or the like by a bucket part of a hydraulic working section at front portion. In the wheel loader, execution of an excavating work is preliminarily detected, and engine revolution speed is preliminarily raised. Even if raising of the engine revolution speed is thus contrived, however, the following problems are present in the wheel loader depicted in FIG. 3.

FIG. 3 depicts distribution of power of the engine in a general wheel loader. The power of the engine 1 in the wheel loader depicted in FIG. 3 must be distributed into all of power 25 for traveling, power 26 for the hydraulic working section at the front, and power 27 for engine acceleration. Therefore, the engine power is great, and its loss is also great accordingly. Further, since the power for engine acceleration is lessened, the acceleration time necessary for attaining a required engine revolution may be increased. As a result, there arises a possibility that the supply of power may fail to be in time for the timing of need for power during excavation.

In consideration of the above-mentioned problems, in the present embodiment, the hybrid wheel loader in which a track structure is electric-motorized by use of a traveling motor 9 has a configuration such that execution of the (1) forward movement relevant to an excavating work is detected prior to the start of the (2) excavating motion, on the basis of motion of the wheel loader. Based on the detection result, the electric power supplied from the electricity storage device 11 to the traveling motor 9 is increased, and while doing so, the revolution speed of the engine 1 is preliminarily raised before the start of the excavating motion, so as to compensate for the engine revolution speed necessary for a smooth excavating motion. By this configuration, the engine revolution can be raised with a smaller loss and in a shorter time.

Figure 6:
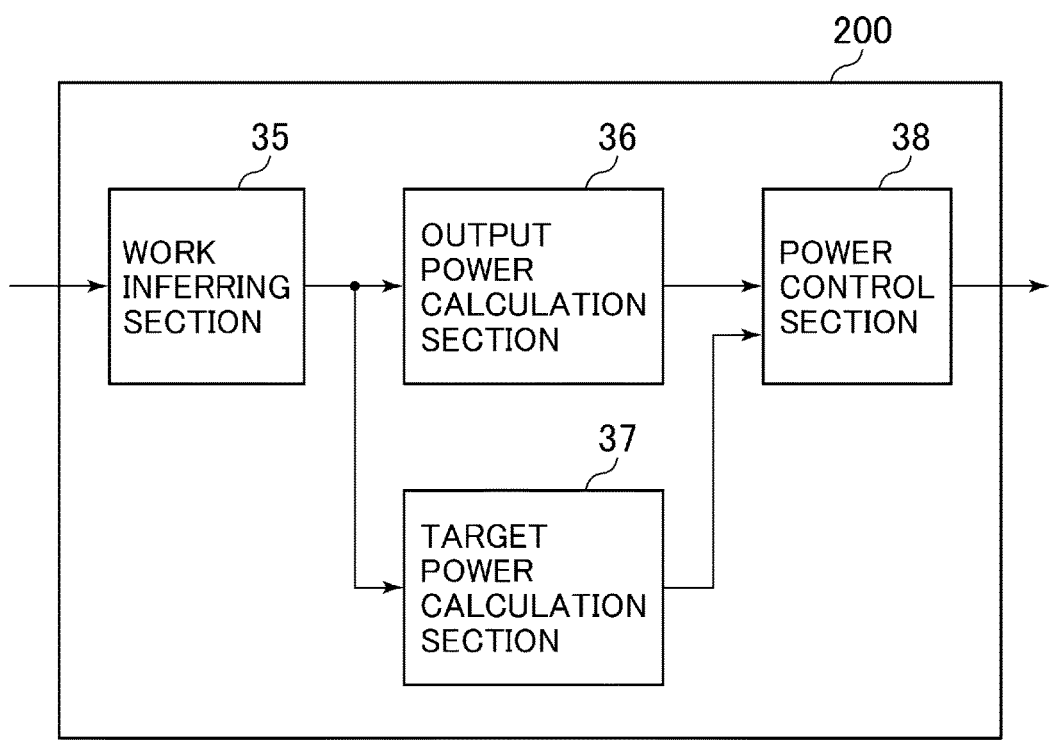
FIG. 6 is a functional block diagram of a control device 200 in a first embodiment of the present invention.

A power deficiency avoiding control at the time of an excavating work of the hybrid wheel loader as a main characteristic feature of the present invention will now be described below. This control is executed by a software process in the control device 200. FIG. 6 is a functional block diagram of the control device 200 according to a first embodiment of the present invention. As depicted in this figure, the control device 200 functions as: a work inferring section 35 that infers a work being conducted by the wheel loader, based on a motion detected from output values of the encoders 62 and the potentiometers 63a and 63b; an output power calculation section 36 that estimates the power being outputted by the engine 1 and the electricity storage device 11 (this power may be referred to as "output power") on the basis of the states of the engine 1 and the electricity storage device 11; a target power calculation section 37 that calculates power ("target power") to be outputted from the engine 1 and the electricity storage device 11 in order to realize a smooth excavating work (excavating motion); and a power control section 38 that performs a control necessary for outputting the target power by utilizing the engine 1 and the traveling motor 9. Note that the "power" relevant to the output power and the target power here refers to the output (the unit is, for example, [kW] or [ph]) of the engine 1 and/or the electricity storage device 11, and is also called power.

Figure 7:
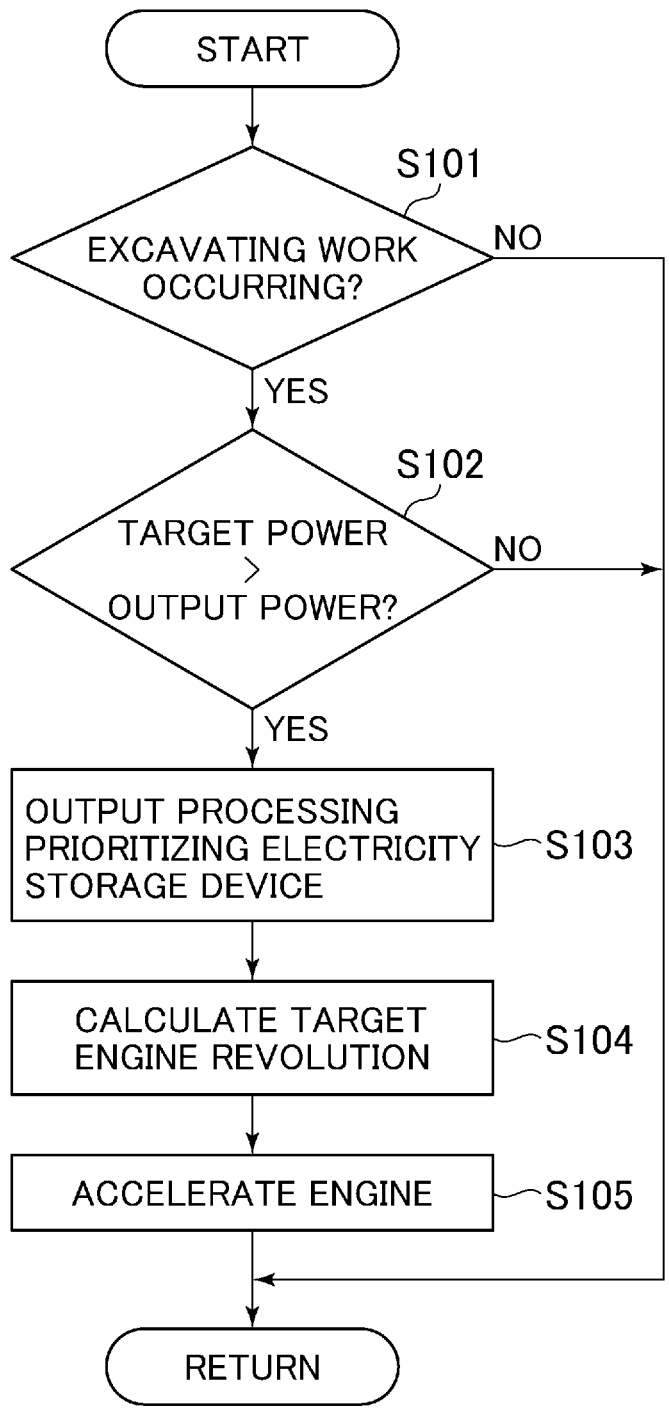
FIG. 7 is a flow chart depicting the contents of processing of a power deficiency avoiding control at the time of excavation according to the first embodiment of the present invention.

Here, the contents of processing of the power deficiency avoiding control at the time of excavation in the hybrid wheel loader according to the first embodiment of the present invention will be described using a flow chart depicted in FIG. 7. When the process depicted in FIG. 7 is started, the work inferring section 35 determines in S101 whether or not the next motion is the (2) excavating motion. Specifically, it is determined whether or not the wheel loader 100 is in the (1) forward movement of traveling towards an object of excavation in order to start an excavating work, and when it is determined as a result that the wheel loader 100 is in the (1) forward movement, it is inferred that the next motion is the (2) excavating motion.

In this embodiment, as a method for the work inferring section 35 to detect in S101 the execution of the forward movement relevant to the excavating work before the start of the excavating motion on the basis of the motion of the wheel loader, a method is used in which the angle detector (potentiometer 63*a*) for detecting the rotational angle of the lift arms 121 relative to the front vehicle body 111, the angle detector (potentiometer 63*b*) for detecting the rotational angle of the bucket 122 relative to the lift arms 121, and the velocity detector (encoder 62) for detecting the velocity of the wheel loader 100 are utilized.

In this method, first, the posture of the hydraulic working device 50 is detected by the two angle detectors 63*a* and 63*b*. As depicted in the vehicle posture figure in FIG. 5, a combination of a state where the lift arms 121 have been lowered most and a state where the aperture portion of the bucket 122 is facing forward is the posture of the hydraulic working device 50 at the time of the (1) forward movement. Then, traveling towards the object of excavation is detected on the basis of a vehicle velocity acquired by the velocity detector 62. When it is thereby found that the posture depicted in FIG. 5 is being taken and the vehicle velocity detected by the velocity detector 62 is not less than a predetermined threshold, it can be inferred that the wheel loader 100 is traveling towards the object of excavation in order to start the excavating work (namely, the (1) forward movement is being conducted) and that the hydraulic working device 50 will thereafter contact the object of excavation to perform an excavating motion.

Note that in this embodiment, the work inferring section 35 determines the posture of the hydraulic working device 50 to be the posture at the time of the (1) forward movement, in the case where the angle detected by the potentiometer 63*a* is within a predetermined range inclusive of the angle corresponding to the most lowered state of the lift arms 121 and where the angle detected by the potentiometer 63*b* is within a predetermined range inclusive of the angle corresponding to a state of the bottom surface of the bucket 122 of being parallel to the ground surface in the most lowered state of the lift arms 121.

In addition, as a difference between the (1) forward movement in the excavating work and the (4) forward movement in the transporting work, the posture of the bucket 122 may be mentioned. In the (4) forward movement relevant to the transporting work, the bucket 122 often maintains its aperture portion facing upward in such a manner as not to drop the matter being transported. Therefore, based on the output value of the potentiometer 63*b*, the forward movement during the excavation and the forward movement during the transport can be distinguished from each other.

Meanwhile, as another detection method for detecting in S101 the execution of forward movement relevant to the excavating work prior to the start of the excavating motion, there is a method in which the distance detector for detecting the distance from the wheel loader 100 to the object of excavation and the velocity detector for detecting the velocity of the wheel loader 100 are utilized. As the distance detector, there can be utilized a camera (image recognition device) 64 (see FIG. 1) mounted over the operating room 116 in such a manner as to be able to shoot the front side of the vehicle. Other than the camera 64, there can also be utilized a laser sensor, a millimeter wave sensor and the like, and, by such a sensor, reflected light or reflected wave from the object of excavation may be detected to thereby detect the distance to the object of excavation. In addition, as the velocity detector, the encoder 62 can be utilized in the same manner as in the preceding case.

In this case, if the approach to the object of excavation is detected in the case where the distance to the object of excavation calculated by the control device 200 on the basis of the output value of the distance detector (camera 64) is less than the threshold, and further, if it is confirmed that the situation is not merely the approach to the object of excavation but "plunge into the object of excavation" in the case where the vehicle velocity detected by the velocity detector (encoder 62) is in excess of a threshold, the work inferring section 35 infers that the forward movement relevant to the excavating work is being carried out. Note that in place of the above-mentioned processing, calculation of time variation of the distance detected by the distance detector may be performed and then detection of the plunge into the object of excavation on the basis of the time variation may be performed.

In the case where it is judged in S101 that the excavating motion is going to be conducted next, the power control section 38 compares the target power considered necessary at the time of the excavating work in the vehicle with the output power which is the current total power of the engine 1 and the electricity storage device 11, thereby determining whether or not power will be deficient in the excavating motion (S102). The calculation of the output power in this instance is carried out in the output power calculation section 36, and the calculation of the target power is conducted in the target power calculation section 37.

In S102, the output power calculation section 36 calculate the output power on the basis of the states of the engine 1 and the electricity storage device 11 (for example, information such as the revolution speed of the engine 1 and the voltage of the electricity storage device 11), and outputs the output power to the power control section 38. Note that in the case where a control of generating an output of the electricity storage device 11 only when the output of the engine 1 is deficient is adopted as the output control for the electricity storage device 11, a situation of deficiency in the output of the engine 1 during the (1) forward movement rarely occurs, so that a situation of outputting of the electricity storage device 11 rarely occurs, and, therefore, the output of the electricity storage device 11 at the time of calculation of the output power may be neglected. In other words, where this kind of control is adopted (or where such a control is deemed as being executed), the output power may be calculated from only the revolution speed of the engine 1.

Meanwhile, the target power is a value that can be approximately estimated based on the current vehicle velocity. Therefore, in S102, the target power calculation section 37 calculates the target power on the basis of the vehicle velocity calculated from the output of the velocity detector 62, and outputs the target power to the power control section 38.

Note that a set value may be outputted from the target power calculation section 37, as the target power. Specifically, a power value (set value) at which a smooth excavating motion can be easily realized may be preliminarily set, and the set value may be utilized as the target power.

In addition, in the case where a control of generating an output of the electricity storage device 11 only when the output of the engine 1 is deficient is adopted (or where such a control is deemed as being executed) as an output control for the electricity storage device 11, the target power can be defined as a target revolution speed of the engine 1, in the same manner as in the case of the output power. Therefore, in S102, the actual revolution speed of the engine 1 may be outputted from the output power calculation section 36, while the target revolution speed of the engine 1 may be outputted from the target power calculation section 37, and a processing of comparing the actual revolution speed with the target revolution speed may be executed in the power control section 38.

In the case where the output power is less than the target power (namely, where the target power is greater than the output power) in S102, in other words, in the case where it is judged that power deficiency will be generated in the subsequent excavating work, the power control section 38 executes an output processing prioritizing the electricity storage device in S103. The output processing prioritizing the electricity storage device means a processing of reducing the amount/proportion of the electric power from the motor generator 6 (or the engine 1), with respect to the electric power supplied to the traveling motor 9, while increasing the amount/proportion of the electric power from the electricity storage device 11 as compared to that in the case where the determination results in S101 and S102 are "No" (in the case where S103 is not executed in the course of control). In other words, the output processing prioritizing the electricity storage device is a processing such that the amount of the electric power generated by driving the motor generator 6 by the engine 1 and supplied to the traveling motor 9 is reduced partly or reduced to zero whereas the amount of the electric power supplied from the electricity storage device 11 to the traveling motor 9 is increased, as compared to the case where S103 is not executed in the course of control.

After the processing of S103 is executed, the power control section 38 calculates (S104) the engine revolution speed (target revolution speed) necessary for outputting the target power of S102 by the engine 1 and the electricity storage device 11, on the basis of the current output power of the engine 1 and the electricity storage device 11, and further, outputs to the engine 1 a command for accelerating the revolution speed of the engine 1 to the target revolution speed, so as to actually accelerate the engine shaft (S105).

Note that, in the case where a control of generating an output of the electricity storage device 11 only when the output of the engine 1 is deficient (or where such a control is deemed as being executed) is adopted as an output control for the electricity storage device 11 and where the aforementioned processing of comparing the actual revolution speed of the engine 1 with the target revolution speed is conducted in S102, a processing may be conducted in which the target revolution speed is calculated in S104 on the basis of the actual revolution speed of the engine 1, and the engine accelerating processing in S105 is executed based on the target revolution speed.

After S105 is finished, the control returns to S101, and the aforementioned processings are repeated. In addition, this applies also to the case where it is judged in S101 that an excavating motion will not be conducted next and the case where it is determined in S102 that the output power is more than the target power.

Figure 8:
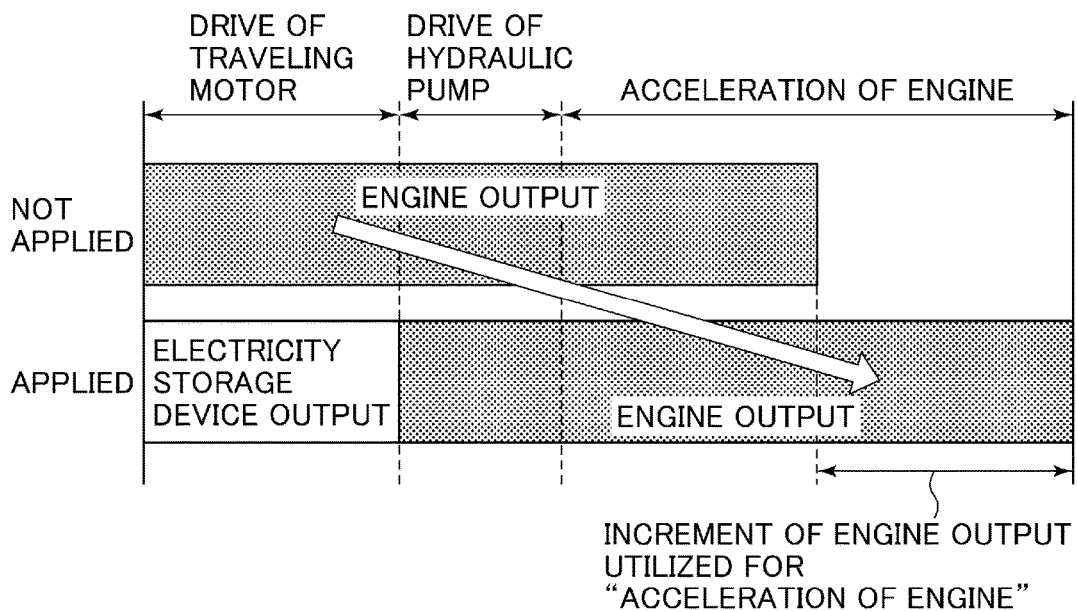
FIG. 8 is a view schematically depicting an example of proportions of power outputted to components, in a case where a series of control processings according to the present invention are applied and in a case where the series of control processings are not applied.

An effect of the series of control processings depicted in FIG. 7 will be described utilizing FIG. 8. FIG. 8 is a view schematically depicting an example of the proportions of power outputted to the components, in the case where the series of control processings depicted in FIG. 7 are applied (bottom row) and the case where they are not applied (top row). In FIG. 8, the hatched part represents the power of the engine 1, and the non-hatched part represents the power of the electricity storage device 11. When the control process depicted in FIG. 7 is applied, by the output processing prioritizing the electricity storage device in S103, the power necessary for the traveling motor 9 is supplied from the electricity storage device 11 as depicted in the bottom row in FIG. 8. As compared to the case of the top row in FIG. 8, therefore, the engine 1 can distribute more power than that in the case of the top row for the acceleration of the engine 1 itself (namely, for increasing the revolution speed).

As a result, the time necessary for accelerating the engine 1 up to the target engine revolution speed is shortened. Therefore, it becomes easy to accelerate the engine 1 to the engine revolution speed necessary for the (2) excavating motion before the hydraulic working device 50 contacts the object of excavation (namely, before the (2) excavating motion is started). Further, since the power from the electricity storage device 11 is distributed to the power of the traveling motor 9 (power for traveling), it is possible to reduce the amount of power distribution to the power for traveling, which distribution is poorer in efficiency as compared to the case where the engine power is distributed to the acceleration of the engine itself, and the loss of the engine 1 can itself be reduced. This can be said to be an effective operation from the viewpoint of an effect on energy saving in a hybrid vehicle.

Note that the proportions of power supplied to the components as depicted in FIG. 8 are merely schematic, and they do not restrict the present invention. For example, while the case where the power of the electricity storage device 11 is zero has been depicted as an example of the top row in FIG. 8, the traveling motor 9 or the motor generator 6 may be driven by the power of the electricity storage device 11. Besides, while the case where the power necessary for driving the traveling motor 9 is entirely supplied from the power of the electricity storage device 11 has been depicted as an example of the bottom row in FIG. 8, there may be cases where only part of the necessary power can be supplied from the electricity storage device 11, depending on the SOC of the electricity storage device 11 or the power demanded by the traveling motor 9. In such cases also, however, the engine output utilizable for the engine acceleration can be increased by that amount of energy which is supplied from the electricity storage device 11 for the driving of the traveling motor 9, and, accordingly, the same kind of effect as above-mentioned can be obtained, although the degree of effect is lower.

Meanwhile, the point of the present invention resides in that the start of an excavating motion is inferred in advance, and the electric power from the electricity storage device 11 is supplied to the traveling motor 9 at a timing earlier than the start of the excavating operation. In a control in the case where the present invention is not used (hereinafter sometimes referred to as "comparative example"), on the other hand, the supply of electric power from the electricity storage device 11 is not started until power deficiency becomes clear after the hydraulic working device 50 contacts the object of excavation and the excavating motion is started. Therefore, the difference between the present invention and the comparative example appears as a difference in the timing of rise in the output power of the electricity storage device 11. The timings of rise in the power of the electricity storage device 11 in the present invention and the comparative example are illustrated in FIG. 9.

Figure 9:
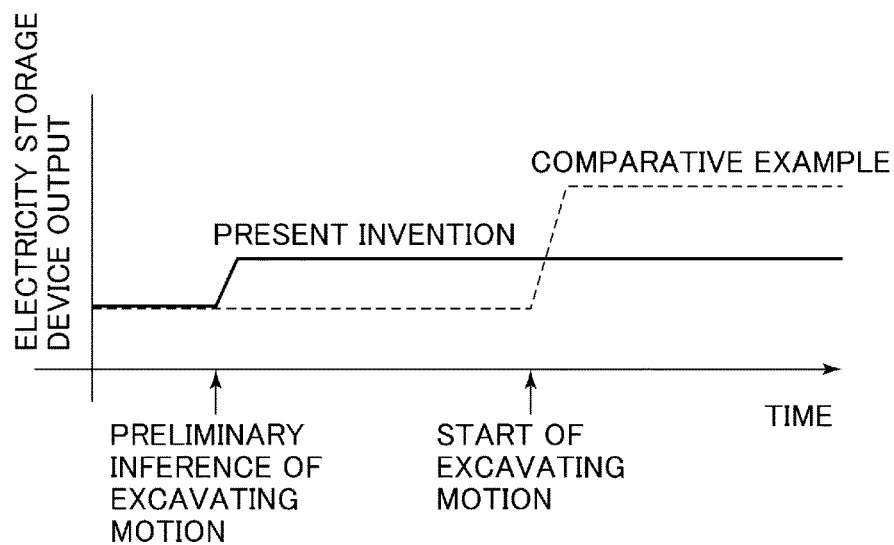
FIG. 9 is a view depicting a difference in output timing of an electricity storage device between the present invention and a comparative example.

As depicted in FIG. 9, in the comparative example, power deficiency is not determined until the excavating motion is started. At the time of starting the excavating motion, it is possible for the engine revolution to have not been risen sufficiently, and a comparatively large amount of electric power is needed until the engine revolution speed increases to an extent necessary for the excavating motion. Besides, in this instance, the behavior of the excavating motion of the vehicle may fail to be a smooth motion due to power deficiency.

On the other hand, in the present invention, as depicted in FIG. 9, since the start of an excavating motion is inferred during forward movement and the power of the electricity storage device 11 is supplied to the traveling motor 9 before the start of the excavating motion, a state where the engine 1 can output sufficient power for the excavating motion has highly probably been attained at the time of actual start of excavation. In addition, the output of the electricity storage device 11 itself is not much varied, and, therefore, the excavation motion can be continued smoothly.

As has been described above, in the present embodiment, the excavating motion is inferred beforehand in the control device 200, and the revolution speed of the engine 1 is raised smoothly by preferentially using the electric power of the electricity storage device 11 for the traveling motor 9, whereby the work can be continued without generation of power deficiency at the time of starting the excavating motion. According to this embodiment, therefore, required power can be drawn from the engine at the time of excavation, without worsening fuel consumption, even in the case where the engine revolution speed is lowered and where there is a possibility that power deficiency may occur during the subsequent excavating work.

Note that in the case where there is surplus electric power in the electricity storage device 11 even if electric power is supplied from the electricity storage device 11 to the traveling motor 9 in S103 in FIG. 7, it is further possible to use the surplus electric power to cause power running of the motor generator 6, thereby assisting the acceleration of the engine 1. When the engine acceleration is thus assisted by the motor generator 6, the time required for accelerating the engine 1 to the target engine revolution speed can be further shortened. In addition, the fuel consumption of the engine in this instance can also be reduced.

Meanwhile, in the present embodiment as above, whether or not the series of processings from S102 to S105 in FIG. 7 should be executed has been determined based on the result of determination by the work inferring section 35. In place of this configuration, the control device 200 may have a configuration in which whether or not the series of processings from S102 to S105 should be executed is determined according to a switch position of a work setting switch 65 that is manually operated by the operator. A configuration example in this case will be described below, as a second embodiment of the present invention.

Figure 10:
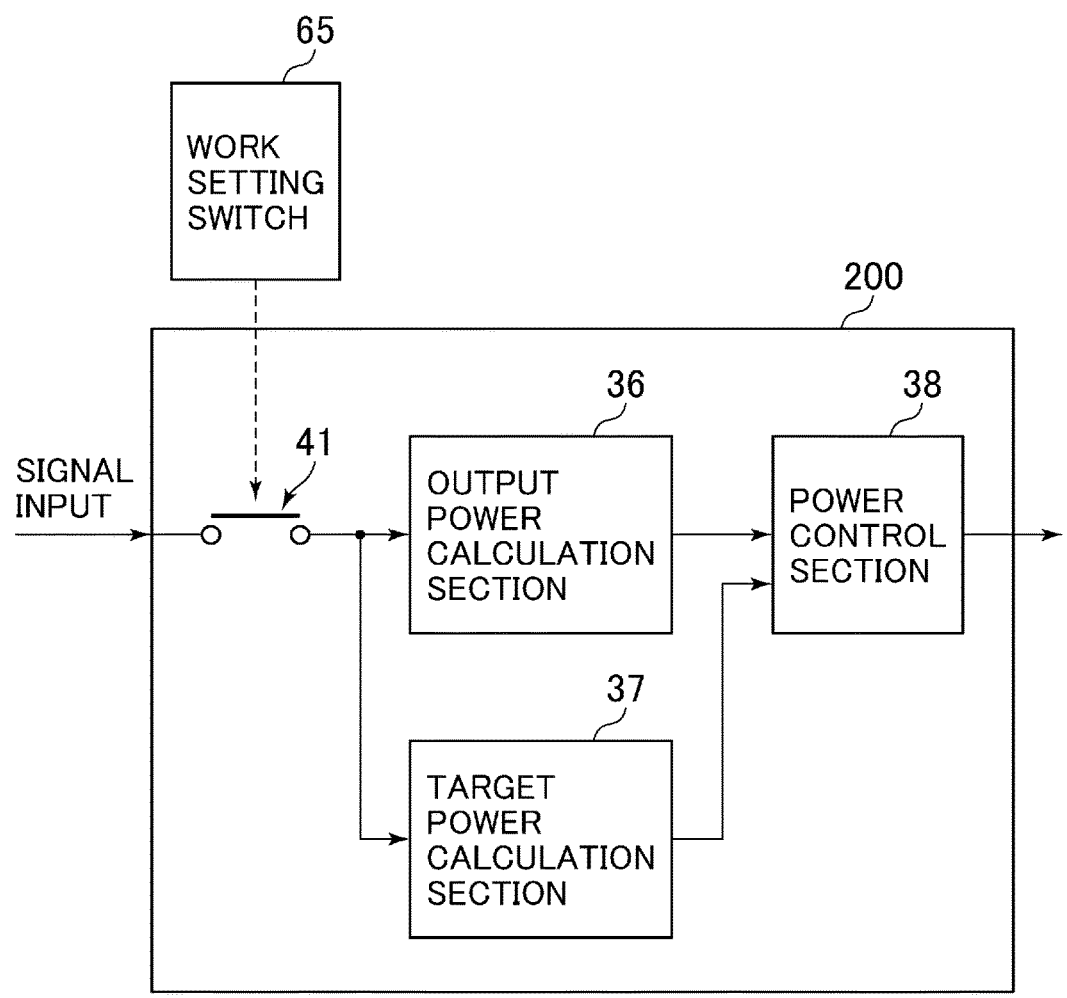
FIG. 10 is a functional block diagram of a control device 200 in a second embodiment of the present invention.

FIG. 10 is a functional block diagram of a control device 200 in a second embodiment of the present invention. The control device 200 depicted in this figure has a switch section 41 in place of the work inferring section 35. The switch section 41 operates in conjunction with the switch position of the work setting switch 65. In the switch section 41, contact points are put into contact, to close a circuit, when the work setting switch 65 is in the first switch position (ON position) for instructing continued execution of the series of processings from S102 to S105, and the contact points are separated, to open the circuit, when the work setting switch 65 is in the second switch position (OFF position).

Figure 11:
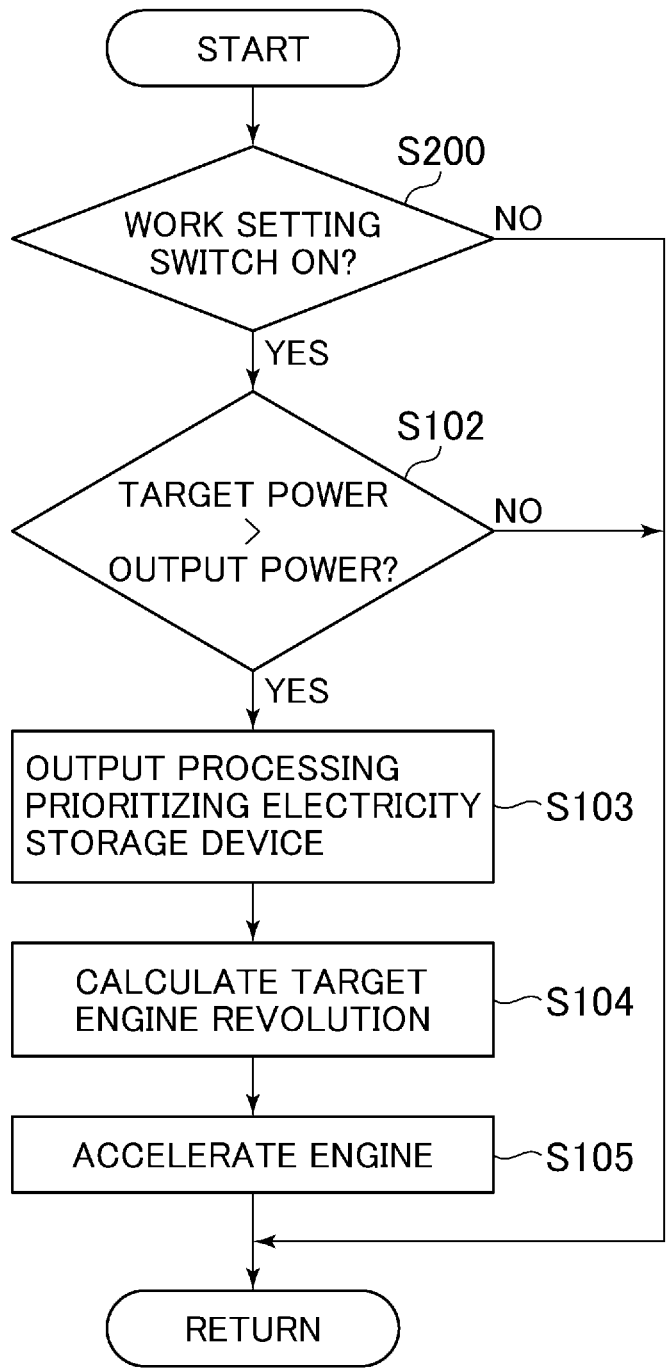
FIG. 11 is a flow chart depicting the contents of processing of a power deficiency avoiding control at the time of excavation according to the second embodiment of the present invention.

FIG. 11 is a flow chart depicting the contents of processing in a power deficiency avoiding control at the time of excavation in a hybrid wheel loader according to the second embodiment of the present invention. The process depicted in FIG. 11 includes, in place of S101, switch position judging logic (S200) for the work setting switch 65. In S200, the control device 200 determines whether or not the switch position of the work setting switch 65 is in the ON position. When it is determined in S200 that the switch position of the work setting switch 65 is in the ON position (first switch position), the series of processings starting from S102 is executed in the same manner as in FIG. 7. As a result, the electric power supplied from the electricity storage device 11 to the traveling motor 9 is increased in S103, as compared to the case where the work setting switch 65 is in the OFF position.

On the other hand, when it is determined in S200 that the switch position of the work setting switch 65 is in the OFF position, the control returns to S200, and the processing is repeated (or the control waits for the work setting switch 65 to be changed over to the ON position).

In the first embodiment, since the start of the excavating motion is inferred beforehand on the basis of the motion of the wheel loader, it cannot be denied that there is a possibility of discrepancy between the inference and the actual work. In the case where it is made clear beforehand that an excavating work is going to be carried out continuedly, it may sometimes be preferable to initially make such a setting as to perform the series of processings from S102 to S105. In view of this, in the present embodiment, a state where the series of processings from S102 to S105 relevant to the driving of the traveling motor 9 and acceleration of the engine 1 can be executed is maintained during when the work setting switch 65 is in the ON position. According to the present embodiment, therefore, effective use of the wheel loader along a working plan or the like can be easily conducted according to the intention of the operator. For example, in a situation where continued execution of an excavating work is presumed, the work can be carried out by changing over the work setting switch 65 into the ON position. In addition, in the case where it is preliminarily known that a situation where movement of the wheel loader is mainly aimed at and an excavating work is not performed is going to continue, the intended work can be performed by changing over the work setting switch 65 into the OFF position.

Note that while the hybrid system depicted in FIG. 2 has a configuration of a so-called series type, the present invention is not limited to the configuration depicted in FIG. 2. The present invention is applicable to a hybrid system that at least includes a series type configuration. Further, the present invention is applicable also to a hybrid system of a parallel type.

In addition, the present invention is not limited to the aforementioned embodiments, but includes various modifications that fall within the scope of the gist of the invention. For instance, the present invention is not limited to those which have all the components described in the above embodiments, but includes those in which part of the above components is eliminated. Besides, part of the components according to one embodiment can be added to or substituted for or by the components according to other embodiment.

In addition, part or the whole of the components according to the aforementioned control device 200, the functions of the components, executions thereof, and the like may be realized with hardware (for example, a logic for executing each function is designed with an integrated circuit). Besides, the components relevant to the aforementioned control device 200 may be programs (software) such that each of the functions relevant to the components of the control device 200 is realized by reading and executing the program by a processing unit (for example, CPU). Information relevant to the programs can be stored, for example, in a semiconductor memory (flash memory, SSD, etc.), magnetic storage device (hard disk drive, etc.), recording medium (magnetic disk, optical disk, etc.) or the like.

In addition, in the description of the embodiments above, those control lines and data lines considered necessary for explanation of the embodiments have been shown, but have not necessarily included all the control lines and data lines concerning the product. It may be considered that, in practice, substantially all the components are interconnected.

DESCRIPTION OF THE REFERENCE NUMERALS

1: Engine
4: Hydraulic pump
6: Motor generator
9: Traveling motor
11: Electricity storage device
35: Work inferring section
36: Output power calculation section
37: Target power calculation section
38: Power control section
41: Switch section
50: Hydraulic working device
61: Wheels
62: Encoder (velocity detector)
63: Potentiometer (angle detector)
65: Work setting switch
111: Front vehicle body
116: Operating room
121: Lift arm
122: Bucket
200: Control device

The invention claimed is:

1. A hybrid wheel loader that travels by driving a traveling motor through utilizing at least one of electric power generated by driving a motor generator by an engine and electric power stored in an electricity storage device and that has a hydraulic working device on a front side of the vehicle, the hybrid wheel loader comprising:
  a motion detector that detects a motion of the wheel loader; and
  a control device configured to estimate output power being outputted by the engine and the electricity storage device when the wheel loader is inferred on the basis of an output value of the motion detector to be traveling towards an object of excavation in order to start an excavating work, and then, if the output power is less than target power considered necessary for the excavating work, accelerate the engine to an engine revolution speed necessary for outputting the target power by the engine and the electricity storage device while increasing the electric power supplied from the electricity storage device to the traveling motor as compared with the electric power supplied when the wheel loader is inferred not to be traveling towards an object of excavation in order to start an excavating work.

2. The hybrid wheel loader according to claim 1, wherein the motion detector includes position detectors that detect positions of a bucket and a lift arm included in the hydraulic working device, and a velocity detector that detects velocity of the wheel loader, and
the control device configured to infer whether or not the wheel loader is traveling towards the object of excavation in order to start the excavating work, on the basis of the positions of the bucket and the lift arm and the velocity.

3. The hybrid wheel loader according to claim 1, wherein the motion detector includes a distance detector that detects distance from the wheel loader to the object of excavation, and a velocity detector that detects velocity of the wheel loader, and
the control device configured to infer whether or not the wheel loader is traveling towards the object of excavation in order to start the excavating work, on the basis of the distance to the object of excavation and the velocity.

4. A hybrid wheel loader that travels by driving a traveling motor through utilizing at least one of electric power generated by driving a motor generator by an engine and electric power stored in an electricity storage device and that has a hydraulic working device on a front side of the vehicle, the hybrid wheel loader comprising:
  a switch selectively switched into a first switch position and a second switch position, and
  a control device configured to estimate output power being outputted by the engine and the electricity storage device when the switch is in the first switch position, and then, if the output power is less than target power considered necessary for an excavating work, accelerate the engine to an engine revolution speed necessary for outputting the target power by the engine and the electricity storage device while increasing the electric power supplied from the electricity storage device to the traveling motor as compared with the electric power supplied when the switch is in the second switch position.

5. The hybrid wheel loader according to claim 1, wherein the control device configured to, when there is surplus electric power in the electricity storage device even if electric power is supplied from the electricity storage device to the traveling motor, further put the motor generator into a power running operation and accelerate the engine by the surplus electric power.

* * * * *